United States Patent
Duan et al.

(10) Patent No.: US 10,813,007 B2
(45) Date of Patent: Oct. 20, 2020

(54) CHANNEL SELECTION METHOD FOR WIRELESS DEVICE AND WIRELESS DEVICE

(71) Applicant: HAN Networks Co., Ltd., Beijing (CN)

(72) Inventors: Mingzhe Duan, Beijing (CN); Zhimin Chang, Beijing (CN)

(73) Assignee: HAN NETWORKS CO., LTD., Beijing (CN)

( * ) Notice: Subject to any disclaimer, the term of this patent is extended or adjusted under 35 U.S.C. 154(b) by 0 days.

(21) Appl. No.: 16/407,280

(22) Filed: May 9, 2019

(65) Prior Publication Data

US 2019/0373508 A1 Dec. 5, 2019

(51) Int. Cl.
*H04W 4/00* (2018.01)
*H04W 28/16* (2009.01)
*H04W 88/08* (2009.01)

(52) U.S. Cl.
CPC ............ *H04W 28/16* (2013.01); *H04W 88/08* (2013.01)

(58) Field of Classification Search
CPC ..... H04W 28/16; H04W 40/24; H04W 72/02; H04W 88/08
See application file for complete search history.

(56) References Cited

U.S. PATENT DOCUMENTS

| 2007/0149230 A1* | 6/2007 | Song | H04W 72/02 455/515 |
| 2013/0316675 A1* | 11/2013 | Luna | H04L 12/1478 455/408 |
| 2018/0269925 A1* | 9/2018 | Matsuo | H04B 7/0617 |

* cited by examiner

*Primary Examiner* — Minh Trang T Nguyen
(74) *Attorney, Agent, or Firm* — Steven M. Greenberg, Esq.; Shutts & Bowen LLP (57) ABSTRACT

The invention discloses a wireless device and a channel selection method thereof, comprising: Step S1, a channel selection device launches into an operating state; Step S2, the channel selection device scans adjacent access devices and sends a state query request; Step S3, the channel selection device judges whether any adjacent access device is in the operating state by feedback information for the state query request; if the result shows "No", turning to Step S5; Step S4, the channel selection device switches into a waiting state, and returning to Step S2 after a predefined first delay; and Step S5, the channel selection device maintains in the operating state, and executes an automatic channel selection, then exits. The problem of channel selection by a plurality of neighboring wireless devices is solved; a channel congestion problem is relieved; the connection quality of the wireless network is improved; and the user experience is upgraded.

9 Claims, 4 Drawing Sheets

CHANNEL SELECTION METHOD FOR WIRELESS DEVICE AND WIRELESS DEVICE

CROSS-REFERENCE TO RELATED APPLICATIONS

The present application claims priority to and the benefit of Chinese Patent Application No. CN 201810559208.5, filed on Jun. 1, 2018, the entire content of which is incorporated herein by reference.

BACKGROUND OF THE INVENTION

1. Field of the Invention

The invention relates to the field of wireless network technologies, and more particularly, to a channel selection method for a wireless device and a wireless device.

2. Description of the Related Art

The wireless channel is like a communication path between two wireless devices. Specifically, the wireless channel is a data transmission path using a radio signal as a transmission medium. Various wireless device need to use the wireless channel for wireless data transmission. In the prior art, the number of wireless channels is finite, and the number of available wireless channels is even more lacking. As a result, wireless devices have to select their respective channels from the finite number of wireless channels when executing wireless data transmission. In addition, channel congestion shall occur if multiple wireless devices choose the same channel at the same time, thereby, user experience is degraded.

At present, most of the Access Points (AP) usually adopt the automatic channel selection function when selecting the wireless channel. However, when multiple devices are switched on at the same time, collision may occur when multiple devices execute the automatic channel selection to choose the same channel coincidently, in which case, the channel congestion as described above could not be avoided. Furthermore, once a wireless device successfully executes the automatic channel selection without abnormality being detected, the wireless device will not select the wireless channel again. Such a channel selection method will put the wireless device in an endless loop of the channel congestion. Thus, the quality of wireless communication is reduced, and the user experience is degraded.

SUMMARY OF THE INVENTION

Given that the foregoing problems exist in the prior art, the present invention provides solutions of a channel selection method for a wireless device and a wireless device, which is intended to achieve the following purposes, namely, a problem of channel selection by a plurality of adjacent wireless devices at the same time is solved, a channel congestion problem is relieved, the connection quality of the wireless network is improved, and the user experience is enhanced.

The above-mentioned technical solutions are described as follows:

A channel selection method for a wireless device, comprises: defining at least one wireless access group, assigning a plurality of wireless devices which are adjacent to each other to a same wireless access group, selecting one of the wireless devices from each of the wireless access groups as a channel selection device, enabling a wireless access control function of the channel selection device, and the remaining wireless devices in the wireless access group functions as adjacent access devices, and the method further comprises:

Step S1, the channel selection device launches into an operating state of an automatic channel selection function;

Step S2, the channel selection device scans all of the adjacent access devices in the same wireless access group, and sends a state query request to each of the adjacent access devices respectively;

Step S3, the channel selection device judges whether any of the adjacent access devices in the same wireless access group is in the operating state of the automatic channel selection function by feedback information for the state query request;

If the result shows "No", turning to Step S5;

Step S4, the channel selection device switches into a waiting state of the automatic channel selection function, and returning to Step S2 after a predefined first delay;

Step S5, the channel selection device maintains in the operating state of the automatic channel selection function, and executes an automatic channel selection action, and then exits.

Preferably, in the channel selection method, the channel selection device scans all of the adjacent access devices in the same wireless access group after it is switched on, and creates an adjacent access device list with device information of all of the adjacent access devices;

in Step S1, the channel selection device sends the state query request to the adjacent access devices according to the adjacent access device list;

in Step S3, the channel selection device receives the feedback information from the adjacent access devices according to the adjacent access device list.

Preferably, in the channel selection method, the device information comprises MAC address information and/or IP address information of the adjacent access devices.

Preferably, in the channel selection method, each of the adjacent access devices inspects its own automatic channel selection function after receiving the state query request from the channel selection device, so as to judge whether the automatic channel selection function is in the operating state;

if the result shows "yes", the adjacent access device sends feedback information to the channel selection device, the feedback information indicates that a wireless access control is rejected;

otherwise, the adjacent access device does not send any feedback information to the channel selection device.

Preferably, in the channel selection method, in Step S3, after sending the state query request, the channel selection device fails to receive any of the feedback information after a predefined second delay, then the channel selection device judges that none of the adjacent access devices in the same wireless access group is in the operating state of the automatic channel selection function.

A wireless device, wherein the wireless device is assigned in a wireless access group comprising adjacent access devices adjacent to the wireless device;

wherein the wireless device comprises:

a state control unit for controlling the wireless device to enable an automatic channel selection function, and for controlling the wireless device to launch into an operating state or to switch into a waiting state when the wireless access function is enabled;

a scanning unit for scanning all of the adjacent access devices in the wireless access group after the wireless device is switched on, creating and storing an adjacent access device list with device information of all of the adjacent access devices in the wireless access group;

a sending unit, connected to the state control unit and the scanning unit, respectively, and configured to send the state query request to all of the adjacent access devices in the wires access group according to the adjacent access device list when the wireless device is in the operating state of the automatic channel selection function;

a receiving unit, connected to the scanning unit, and configured to receive a feedback information for the state query request from the adjacent access devices according to the adjacent access device list;

a judgement unit, connected to the receiving unit and the state control unit, respectively, and configured to judge whether any of the adjacent access devices in the wireless access group is in the operating state of the automatic channel selection function by the feedback information, and configured to output a corresponding first result;

a channel selection unit, connected to the judgement unit, configured to enable the channel selection function of the wireless device when none of the adjacent access devices is in the operating state of the automatic channel selection function according to the first result, and configured to execute an automatic channel selection;

wherein the state control unit is further configured to switch the wireless device into the waiting state of the automatic channel selection function when at least one of the adjacent access devices is in the operating state of the automatic channel selection function according to the first result;

after the wireless device is switched into the waiting state of the automatic channel selection function and after a predefined first delay is reached, the sending unit re-sends the state query request to all of the adjacent access devices in the wireless access group.

Preferably, in the wireless device, the receiving unit is further configured to receive the state query request sent by each of the adjacent access devices in the wireless access group;

the wireless device further comprises:

an inspection unit, connected to the receiving unit and the sending unit, respectively, and configured to inspect built-in automatic channel selection function according to the received state query request, so as to judge whether the automatic channel selection function is in the operating state, and output a second result;

the sending unit sends a feedback information, indicating that a wireless access control is rejected, for the adjacent access device from which the state query request is sent according to the adjacent access device list when the wireless device is in the operating state of the automatic channel selection function, according to the second result.

Preferably, in the wireless device, the device information comprises MAC address information and/or IP address information of the adjacent access devices in the wireless access group.

Preferably, in the wireless device, the judgement unit is further connected to the sending unit;

wherein the judgement unit further comprises:

a timing module for starting the time after the sending unit sends the state query request;

a judgement module, connected to the timing module, configured to output the first result, indicating that one of the adjacent access devices is in the operating state of the automatic channel selection function, when receiving the feedback information from any of the adjacent access devices, and configured to output the first result, indicating that none of the adjacent access devices is in the operating state of the automatic channel selection function, if the receiving unit does not receive the feedback information until the timing module reaches a predefined second delay.

The technical solutions have the following beneficial effects:

1. a channel selection method for a wireless device is provided. In this case, a problem of channel selection by a plurality of neighboring wireless devices at the same time is solved; a channel congestion problem is relieved; the connection quality of the wireless network is improved; and the user experience is upgraded.

2. a wireless device is provided, which is intended to facilitate the implementation of the above-mentioned channel selection method.

BRIEF DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "plurality" means a number greater than one.

Hereinafter, certain exemplary embodiments according to the present disclosure will be described with reference to the accompanying drawings.

According to the above-mentioned problems in the prior art, there is provided a channel selection method for a wireless device. In the channel selection method, at least one wireless access group is defined, a plurality of wireless devices which are adjacent to each other are assigned in a same wireless access group, then one of the plurality of wireless devices is selected from each of the wireless access groups to function as a channel selection device, a wireless access control function of the channel selection device is enabled, and the remaining wireless devices in the wireless access group function as adjacent access devices. Specifically, a principle for defining the wireless access group is to ensure that the wireless devices in the same area are included in the same wireless access group, that is, the wireless devices, which are likely to select the same wireless channel, are included in the same wireless access group.

Figure 1:
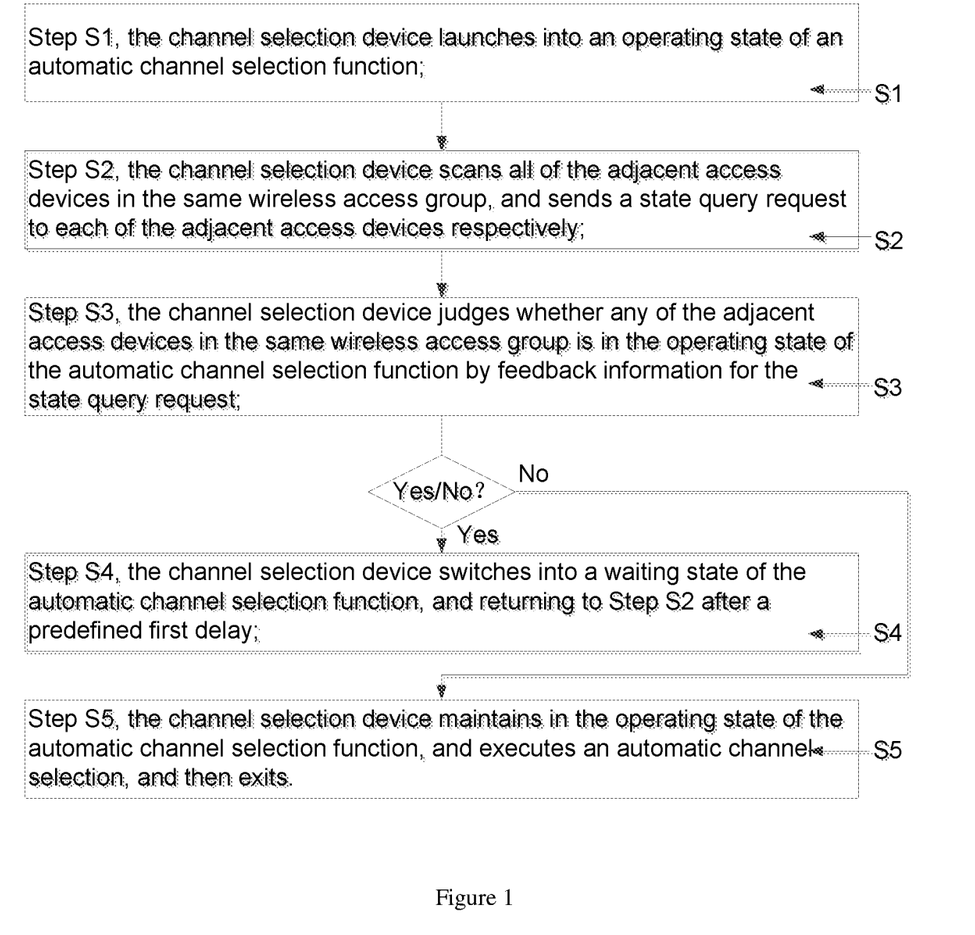
FIG. 1 is a general flow chart of a channel selection method for a wireless device according to a preferred embodiment of the present invention.

The channel selection method is shown in detail in FIG. 1, comprises:

Step S1, the channel selection device launches into an operating state of an automatic channel selection function;

Step S2, the channel selection device scans all of the adjacent access devices in the same wireless access group, and sends a state query request to each of the adjacent access devices respectively;

Step S3, the channel selection device judges whether any of the adjacent access devices in the same wireless access group is in the operating state of the automatic channel selection function by feedback information for the state query request;

if the result shows "No", turning to Step S5;

Step S4, the channel selection device switches into a waiting state of the automatic channel selection function, and returning to Step S2 after a predefined first delay;

Step S5, the channel selection device maintains in the operating state of the automatic channel selection function, and executes an automatic channel selection, and then exits.

Specifically, in this embodiment, the above-mentioned channel selection function is the automatic channel selection (ACS, hereinafter) function. The operating state of the above-mentioned automatic channel selection function is the operating state of the ACS, and the waiting state of automatic channel selection function is the waiting state of the ACS. In the context, specific terms are used to represent corresponding nouns, and details will not be repeated herein.

In this embodiment, any one of wireless devices in the same wireless access group may be selected as a channel selection device, and the channel selection device enables the ACS function. That is, any one of the wireless devices in the wireless access group may become the channel selection device. And the "adjacent access device" described above is a relative concept, that is to say, for a certain channel selection device, the remaining wireless devices in the same wireless access group will become the adjacent access devices with respect to the channel selection device. In other words, the working mode of the wireless device may be switched between the channel selection device and the adjacent access device.

In this embodiment, the channel selection device scans all of the device information of adjacent access devices in the same wireless access group after it is switched on, and creates an adjacent access device list according to a scanning result; the channel selection device sends a request to an adjacent access device during the selection of the channel according to the adjacent access device list, and receives feedback information from the adjacent access device.

Furthermore, since each of the plurality of wireless devices may become the channel selection device or the adjacent access device, each of the wireless devices needs to scan the remaining adjacent wireless device in the same wireless access group after it is switched on, so as to form an adjacent access device list and store the list, in order to send and receive messages later.

In this embodiment, when switching into the operating state, the channel selection device sends a state query request to all of the adjacent access devices in the same wireless access group according to the adjacent access device list which is created by pre-scanning the adjacent access devices, and the state query request is mainly used for querying a current state of each of the adjacent access devices.

In this embodiment, after receiving the state query request, each of the adjacent access devices may inspect its own current state, and choose to or not to send feedback information to the channel selection device which sends the state query request, according to a inspecting result (detailed information will be described below).

The channel selection device judges whether any of the adjacent access devices is currently in the operating state of the ACS by inspecting the received feedback information: if yes, the channel selection device switches its own state into the waiting state of the ACS. That is to say, the channel selection device will not execute the channel selection if any one of the adjacent access devices in the same wireless access group is in the operating state of the ACS.

In this embodiment, when the channel selection device is in the waiting state of the ACS, the channel selection device starts a timing until a predefined first delay is reached, it sends again the state query requests to all of the adjacent access devices in the same wireless access group, so as to repeat the process of querying the current state of the adjacent access device until none of the adjacent access devices is in the operating state of the ACS. Then the channel selection device begins to execute the automatic channel selection. Furthermore, the predefined first delay is set to 5 minutes, or it can be other suitable delay, which will not be described herein.

In this embodiment, during the above process, the wireless device (the channel selection device) continuously queries the current states of other adjacent access devices in the same wireless access group, ensuring that only when the channel selection device is in the operating state will the automatic channel selection begin. In doing so, a problem of channel selection by a plurality of neighboring wireless devices at the same time is solved; a channel congestion problem is relieved; the connection quality of the wireless network is improved; and the user experience is upgraded.

In a preferred embodiment of the invention, the device information comprises MAC address information and/or IP address information of the plurality of adjacent access devices. That is, information representing attribute information of the respective adjacent access devices in the adjacent access device list is the MAC address information and/or IP address information of the adjacent access devices.

In a preferred embodiment of the invention, each of the plurality of adjacent access devices inspects its own automatic channel selection function after receiving the state query request from the channel selection device, so as to judge whether the automatic channel selection function is in the operating state;

If the result shows "yes", the adjacent access device sends feedback information to the channel selection device, the feedback information indicates that a wireless access control is rejected;

otherwise, the adjacent access device does not send any feedback information to the channel selection device.

Specifically, in this embodiment, the adjacent access device may inspect its own current state according to the state query request. Only when the adjacent access device finds that it is also in the operating state of the ACS will the adjacent access device send the feedback information to the channel selection device. In other words, if the channel selection device receives the feedback information from one of the adjacent access devices, it can judge that the adjacent access device is in the operating state of the ACS.

In a preferred embodiment of the invention, in Step S3, after sending the state query request, the channel selection device does not receive any of the feedback information after a predefined second delay, then the channel selection device judges that none of the adjacent access devices is in the operating state of the automatic channel selection function.

Therefore, principles for judging the state of the channel selection device after it sends the state query request are listed as follows:

1. once the channel selection device receives feedback information, it means that at least one of the adjacent access devices is in the operating state of the ACS, then the channel selection device switches into the waiting state of the ACS;

2. after sending the state query request, the channel selection device does not receive any feedback information after a predefined second delay, then it means that none of the adjacent access devices in the same wireless access group is in the operating state of the ACS, and the channel selection device may maintain in the operating state of the ACS, and begins to execute the automatic channel selection. Furthermore, the predefined second delay is set to 10 minutes, or it can be other suitable delay, which will not be described herein.

In a preferred embodiment of the invention, a specific embodiment of the channel selection method for the wireless device shown in FIGS. 2-5 is illustrated:

In FIGS. 2-5, AP1 functions as the channel selection device, AP2-AP5 function as the adjacent access devices in the same wireless access group, that is, the wireless access group comprises AP1-AP5.

Figure 2:
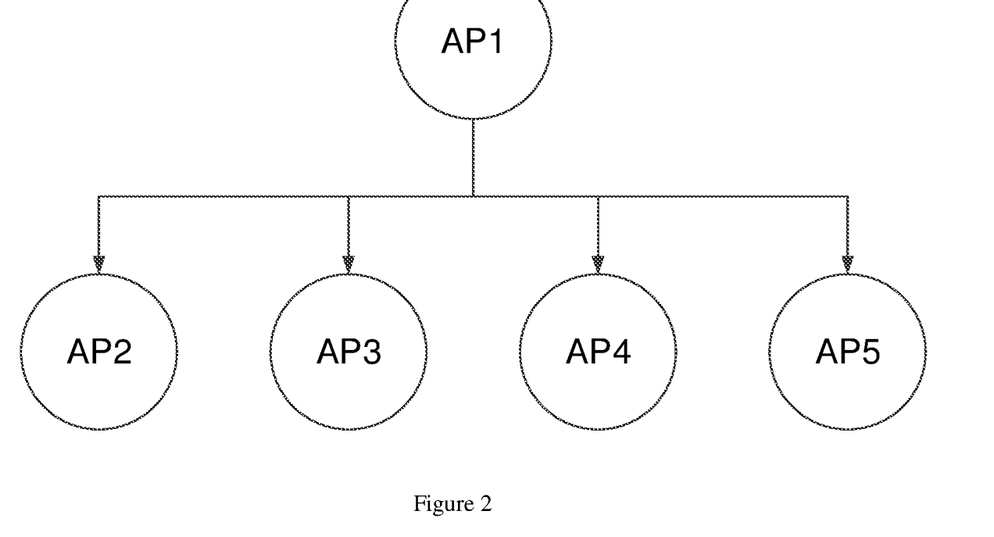
FIGS. 2-4 is a schematic diagrams of the channel selection method according to a preferred embodiment of the present invention.

In FIG. 2, AP1 functions as the channel selection device and is in the operating state of the ACS, and subsequently AP1 sends the state query request to AP2-AP5, respectively.

Figure 3:
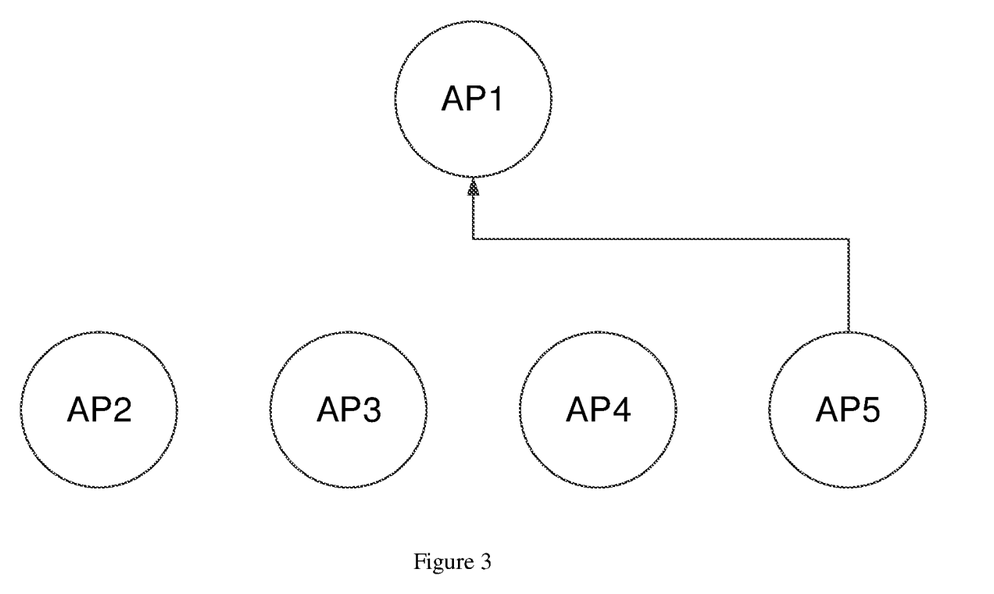

In FIG. 3, each AP that receives the state query request inspects its current state. At this time, if AP2-AP4 are not in the operating state of the ACS, AP2-AP4 will not send feedback information to AP1; if AP5 is in the operating state of the ACS, AP5 will send feedback information to AP1.

The result of this state query is as follows: AP1 receives feedback information sent by AP5, and it judges that AP5 is in the operating state of the ACS, therefore, AP1 switches into the waiting state of the ACS.

After entering the waiting state of the ACS, AP1 waits for a predefined first delay, and sends the state query request to AP2-AP5 again (which is still shown in FIG. 2).

Figure 4:
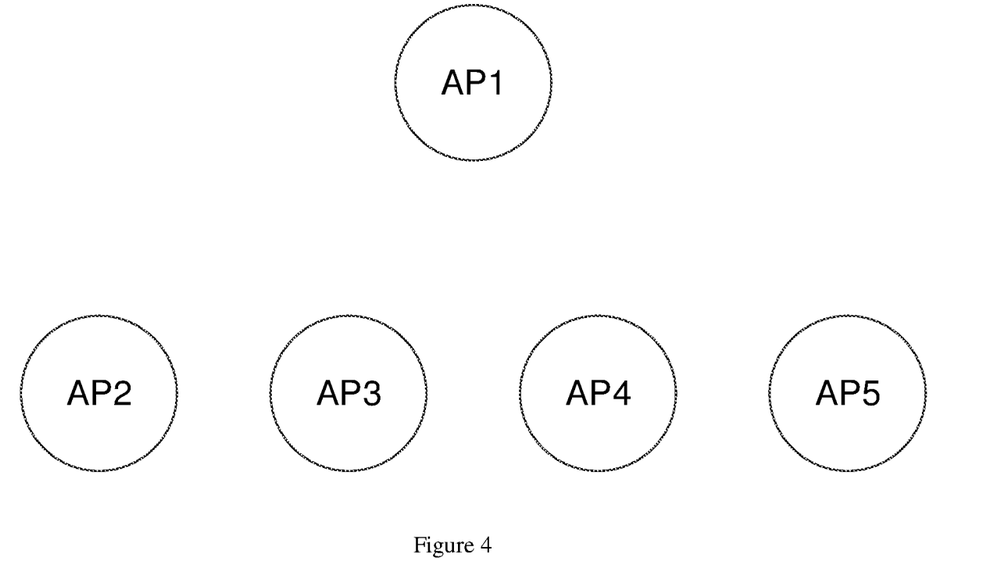

At this time, AP2-AP5 are not in the operating state of the ACS, and feedback information will not be sent to AP1 (as shown in FIG. 4). In the case where AP1 still does not receive any feedback information after waiting for a predefined second delay, AP1 judges that none of the adjacent access devices in the same wireless access group is in the operating state of the ACS, so AP1 maintains in the operating state, and starts the automatic channel selection.

Figure 5:
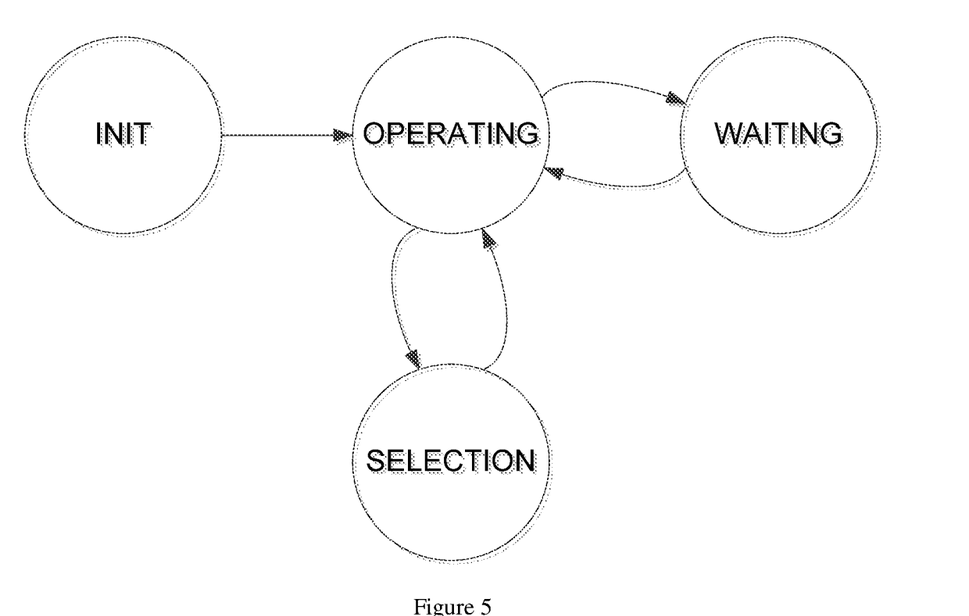
FIG. 5 is a schematic diagram showing the way that an automatic channel selection function in a wireless device is controlled according to a preferred embodiment of the present invention.

In a preferred embodiment of the invention, the principle for controlling the ACS function in a wireless device is shown in FIG. 5 (what is shown in FIG. 5 is a principle for controlling a state machine having the ACS function), the principle mainly comprises:

when an ACS process inside the wireless device is started, the state machine enters an initial (INIT) state in which the wireless device is set to enforce the flag bit, and the wireless device scans from a background scanning module to acquire the device information of the adjacent access device to create an adjacent access device list. The state machine then controls the wireless device to enter the operating state of the ACS;

when the wireless device is in the operating state, the state machine will inspect whether trigger conditions are met and sets the wireless device to enter the waiting state when the trigger conditions are met. Specifically, the trigger conditions may include: 1) the forced execution flag bit has been set or a predefined delay is reached after entering the INIT state; 2) none of WLAN users is connected to the wireless device. If both of the above conditions are met, it means that the trigger conditions have been met. Furthermore, the predefined delay may be 30 minutes.

When the wireless device is in the waiting state, the state machine will inspect whether waiting conditions are met and sets the wireless device to enter the operating state when the waiting conditions are met. Specifically, the waiting conditions may include: 1) notice of other adjacent access devices in the state of the ACS having executed the automatic channel selection is received; 2) the waiting time in the waiting state has exceeded a predefined time period (which may be 5 minutes). If any one of the above conditions is met, it means that the waiting conditions have been met.

When the wireless device enters the selection state (a state in the automatic channel selection operation) from the operating state according to the above-mentioned process of automatic channel selection, the state machine waits for the executing of automatic channel selection to be completed (i.e., the ACS function is completed), and sets the wireless device back to the operating state.

In conclusion, in the present technical solution, a channel selection method for a wireless device is provided. The method has the advantages that a problem of channel selection by a plurality of neighboring wireless devices at the same time is solved; a channel congestion problem is relieved; the connection quality of the wireless network is improved; and the user experience is upgraded.

In a preferred embodiment of the invention, based on the channel selection method for a wireless device described above, a wireless device is provided. The wireless device is assigned in an associated wireless access group comprising adjacent access devices adjacent to the wireless device.

Figure 6:
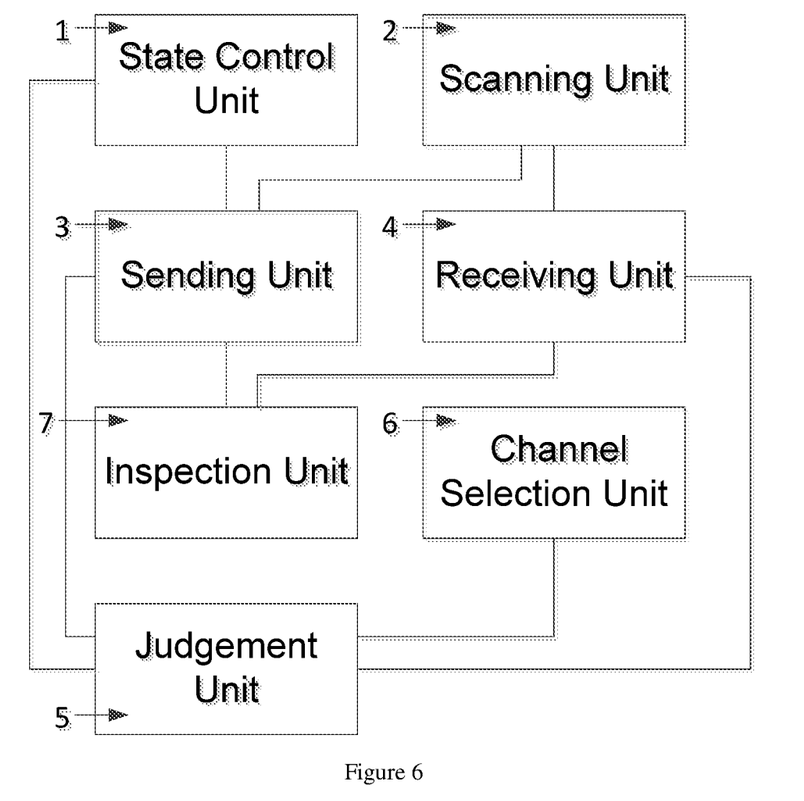
FIG. 6 is a general schematic diagram of a wireless device according to a preferred embodiment of the present invention.

As shown in FIG. 6, the wireless device comprises:

a state control unit 1 for controlling the wireless device to enable an automatic channel selection function, and for controlling the wireless device to launch into an operating state or to switch into a waiting state when the wireless access function is enabled;

a scanning unit 2 for scanning all of the adjacent access devices in the wireless access group after the wireless device is switched on, to create an adjacent access device list with device information of all of the adjacent access devices in the wireless access group and store the list;

a sending unit 3, connected to the state control unit 1 and the scanning unit 2, respectively, and configured to send the state query request to all of the adjacent access devices in the wires access group according to the adjacent access device list when the wireless device is in the operating state of the automatic channel selection function;

a receiving unit 4, connected to the scanning unit 2, and configured to receive a feedback information for the state query request from the plurality of adjacent access devices according to the adjacent access device list;

a judgement unit 5, connected to the receiving unit 4 and the state control unit 1, respectively, and configured to judge whether any of the adjacent access devices in the wireless access group is in the operating state of the automatic channel selection function by the feedback information, and configured to output a corresponding first result;

a channel selection unit 6, connected to the judgement unit 5, configured to enable the channel selection function of the wireless device when none of the adjacent access devices is in the operating state of the automatic channel selection function according to the first result, and configured to execute an automatic channel selection;

wherein the state control unit 1 is further configured to switch the wireless device into the waiting state of the automatic channel selection function when at least one of the adjacent access devices is in the operating state of the automatic channel selection function according to the first result;

after the wireless device is switched into the waiting state of the automatic channel selection function and after a predefined first delay is reached, the sending unit 3 re-sends the state query request to all of the adjacent access devices in the wireless access group.

Specifically, the foregoing wireless device applies the channel selection method described above, wherein each function unit is used to perform one or several steps of the above-mentioned channel selection method. As described above, the wireless device may be a channel selection device or an adjacent access device, therefore the unified expression "wireless device" is used in this embodiment.

In a preferred embodiment of the invention, the receiving unit 4 is further configured to receive the state query request from the adjacent access device in the wireless access group;

Still as shown in FIG. 6, the wireless device further comprises:

an inspection unit 7, connected to the receiving unit 4 and the sending unit 3, respectively, and configured to inspect built-in automatic channel selection function according to the received state query request, so as to judge whether the automatic channel selection function is in the operating state, and output a second result;

the sending unit 3 sends feedback information, indicating that a wireless access control is rejected, for the adjacent access device from which the state query request is sent according to the adjacent access device list when the wireless device is in the operating state of the automatic channel selection function, according to the second result.

Specifically, in this embodiment, a wireless device can not only send the state query request to other adjacent wireless devices (when the wireless device functions as the channel selection device and is in the operating state), but also send feedback information to other adjacent wireless devices (when the wireless device functions as the adjacent access device). Therefore, a sending unit 3 of a wireless device can send two different types of information. Furthermore, the sending unit 3 of the wireless device may be used to implement the data transmission function of the wireless device, and it is not limited to send the state query request and the feedback information.

Similarly, in this embodiment, a wireless device can not only receive the state query request sent by other adjacent wireless devices (when the wireless device functions as the adjacent access device), but also receive feedback information sent by other adjacent wireless devices (when the wireless device functions as the channel selection device and is in the operating state). Therefore, a receiving unit 4 of a wireless device can receive two different types of information. Furthermore, the receiving unit 4 of the wireless device may be used to implement the data receiving function of the wireless device, and it is not limited to receive the state query request and the feedback information.

In a preferred embodiment of the invention, the device information comprises MAC address information and/or IP address information of the adjacent access devices in the wireless access group, as described above.

Figure 7:
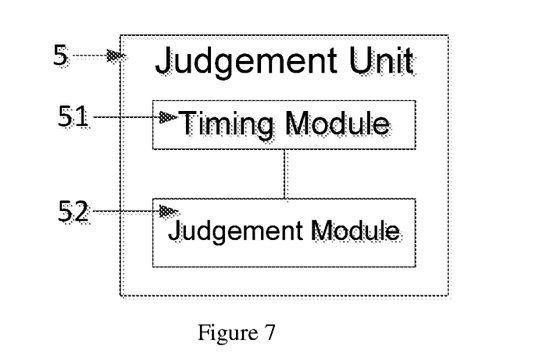
FIG. 7 is a schematic diagram showing a specific structure of a determination unit in a wireless device based on FIG. 6 according to a preferred embodiment of the present invention.

In a preferred embodiment of the invention, the judgement unit 5 is further connected to the sending unit 3;

as shown in FIG. 7, the judgement unit 5 further comprises:

a timing module 51 for starting the time after the sending unit sends the state query request;

a judgement module 52, connected to the timing module 51, configured to output the first result, indicating that one of the adjacent access devices is in the operating state of the automatic channel selection function, when receiving the feedback information from any of the adjacent access devices, and configured to output the first result, indicating that none of the adjacent access devices is in the operating state of the automatic channel selection function, if the receiving unit 4 still does not receive the feedback information until the timing module 51 reaches a predefined second delay.

The principle of the judgement of judgement unit 5 will not be described herein since it has been described in detail in the above mentioned channel selection method.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A channel selection method for a wireless device, comprises:

defining at least one wireless access group, assigning a plurality of wireless devices which are adjacent to each other to a same wireless access group, selecting one of the wireless devices from each of the wireless access groups as a channel selection device, enabling a wireless access control function of the channel selection device, and the remaining wireless devices in the wireless access group function as adjacent access devices, and the method further comprises:

Step S1, the channel selection device launches into an operating state of an automatic channel selection function;

Step S2, the channel selection device scans all of the adjacent access devices in the same wireless access group, and sends a state query request to each of the adjacent access devices respectively;

Step S3, the channel selection device judges whether any of the adjacent access devices in the same wireless access group is in the operating state of the automatic channel selection function by feedback information for the state query request;

If the result shows "No", turning to Step S5;

Step S4, the channel selection device switches into a waiting state of the automatic channel selection function, and returning to Step S2 after a predefined first delay;

Step S5, the channel selection device maintains in the operating state of the automatic channel selection function, and executes an automatic channel selection, and then exits;

wherein in Step S4, when the channel selection device is in the waiting state of the automatic channel selection function, the channel selection device starts a timing until a predefined first delay is reached, the channel selection device sends again the state query requests to all of the adjacent access devices in the same wireless access group, so as to repeat the process of querying the current state of the adjacent access device until none of the adjacent access devices is in the operating state of the automatic channel selection function.

2. The channel selection method of claim 1, wherein the channel selection device scans all of the adjacent access devices in the same wireless access group after it is switched on, and creates an adjacent access device list with device information of all of the adjacent access devices; in Step S1, the channel selection device sends the state query request to the adjacent access devices according to the adjacent access device list; in Step S3, the channel selection device receives the feedback information from the adjacent access devices according to the adjacent access device list.

3. The channel selection method of claim 2, wherein the device information comprises MAC address information and/or IP address information of the adjacent access devices.

4. The channel selection method of claim 1, wherein each of the adjacent access devices inspects its own automatic channel selection function after receiving the state query request from the channel selection device, so as to judge whether the automatic channel selection function is in the operating state;
    if the result shows "yes", the adjacent access device sends feedback information to the channel selection device, the feedback information indicates that a wireless access control is rejected;
    otherwise, the adjacent access device does not send any feedback information to the channel selection device.

5. The channel selection method of claim 1, wherein in Step S3, after sending the state query request, the channel selection device fails to receive any of the feedback information after a predefined second delay, then the channel selection device judges that none of the adjacent access devices in the same wireless access group is in the operating state of the automatic channel selection function.

6. A wireless device, wherein the wireless device is assigned in an wireless access group comprising adjacent access devices adjacent to the wireless device;
    wherein the wireless device comprises:
    a state control unit for controlling the wireless device to enable an automatic channel selection function, and for controlling the wireless device to launch into an operating state or to switch into a waiting state when the wireless access function is enabled;
    a scanning unit for scanning all of the adjacent access devices in the wireless access group after the wireless device is switched on, creating and storing an adjacent access device list with device information of all of the adjacent access devices in the wireless access group;
    a sending unit, connected to the state control unit and the scanning unit, respectively, and configured to send the state query request to all of the adjacent access devices in the wires access group according to the adjacent access device list when the wireless device is in the operating state of the automatic channel selection function;
    a receiving unit, connected to the scanning unit, and configured to receive a feedback information for the state query request from the adjacent access devices according to the adjacent access device list;
    a judgement unit, connected to the receiving unit and the state control unit, respectively, and configured to judge whether any of the adjacent access devices in the wireless access group is in the operating state of the automatic channel selection function by the feedback information, and configured to output a corresponding first result;
    a channel selection unit, connected to the judgement unit, configured to enable the channel selection function of the wireless device when none of the adjacent access devices is in the operating state of the automatic channel selection function according to the first result, and configured to execute an automatic channel selection;
    wherein the state control unit is further configured to switch the wireless device into the waiting state of the automatic channel selection function when at least one of the adjacent access devices is in the operating state of the automatic channel selection function according to the first result; after the wireless device is switched into the waiting state of the automatic channel selection function and after a predefined first delay is reached, the sending unit re-sends the state query request to all of the adjacent access devices in the wireless access group so as to repeat the process of querying the current state of the adjacent access device until none of the adjacent access devices is in the operating state of the automatic channel selection function.

7. The wireless device of claim 6, wherein the receiving unit is further configured to receive the state query request sent by the adjacent access devices in the wireless access group;
    the wireless device further comprises:
    an inspection unit, connected to the receiving unit and the sending unit, respectively, and configured to inspect built-in automatic channel selection function according to the received state query request, so as to judge whether the automatic channel selection function is in the operating state, and output a second result;
    the sending unit sends a feedback information, indicating that a wireless access control is rejected, for the adjacent access device from which the state query request is sent according to the adjacent access device list when the wireless device is in the operating state of the automatic channel selection function, according to the second result.

8. The wireless device of claim 6, wherein the device information comprises MAC address information and/or IP address information of the adjacent access devices in the wireless access group.

9. The wireless device of claim 6, wherein the judgement unit is further connected to the sending unit;
   wherein the judgement unit further comprises:
   a timing module for starting the time after the sending unit sends the state query request;
   a judgement module, connected to the timing module, configured to output the first result, indicating that one of the adjacent access devices is in the operating state of the automatic channel selection function, when receiving the feedback information from any of the adjacent access devices, and
   configured to output the first result, indicating that none of the adjacent access devices is in the operating state of the automatic channel selection function, if the receiving unit does not receive the feedback information until the timing module reaches a predefined second delay.

\* \* \* \* \*